United States Patent
Castillo et al.

(10) Patent No.: US 7,330,510 B2
(45) Date of Patent: Feb. 12, 2008

(54) METHOD FOR DISPLAYING BASE FRAMES DURING VIDEO DATA DECOMPRESSION

(75) Inventors: Michael Castillo, Hillboro, OR (US); Steven D. Yates, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 788 days.

(21) Appl. No.: 10/600,518

(22) Filed: Jun. 19, 2003

(65) Prior Publication Data

US 2004/0258161 A1    Dec. 23, 2004

(51) Int. Cl.
*H04N 7/12* (2006.01)
*G06K 9/36* (2006.01)

(52) U.S. Cl. .................. 375/240.25; 382/233

(58) Field of Classification Search .......... 375/240.25, 375/240.13, 240.02, 240.01, 240.15, 240.03; 382/232, 233; 725/23, 131; 345/84, 418
See application file for complete search history.

(56) References Cited

U.S. PATENT DOCUMENTS

| | | | | |
|---|---|---|---|---|
| 5,668,599 A | * | 9/1997 | Cheney et al. | 375/240.15 |
| 6,078,328 A | * | 6/2000 | Schumann et al. | 345/418 |
| 6,175,380 B1 | * | 1/2001 | Van Den Bosch | 348/84 |
| 6,671,408 B1 | * | 12/2003 | Kaku | 382/232 |
| 7,103,099 B1 | * | 9/2006 | Paz et al. | 375/240.03 |
| 2003/0014748 A1 | * | 1/2003 | Ben-David et al. | 725/23 |
| 2003/0167472 A1 | * | 9/2003 | Barbanson et al. | 725/131 |

* cited by examiner

*Primary Examiner*—Gims Philippe
(74) *Attorney, Agent, or Firm*—Blakely, Sokoloff, Taylor & Zafman LLP (57) ABSTRACT

A method for displaying base frames during video data decompression. A tuner selects a base frame of a compressed digital video data steam. The tuner decompresses the selected base frame prior to decompressing the remaining frames of the digital video data stream, and provides the decompressed base frame to a display device for display prior to the tuner decompressing the remaining frames of the compressed digital video data stream.

32 Claims, 8 Drawing Sheets

METHOD FOR DISPLAYING BASE FRAMES DURING VIDEO DATA DECOMPRESSION

TECHNICAL FIELD

Embodiments of the invention are generally related to the field of digital video data and, in particular, to displaying base frames during digital video data decompression.

BACKGROUND

Analog video data, for example, a motion picture or a television program, may be presented as a digital video data stream from a digital video provider, e.g., in digital cable television, digital satellite television or computer network-downloading environments. A digital video provider may be, e.g., a network server, a digital cable television provider or a digital satellite television provider.

A digital video data stream may be compressed into frames, specifically base frames and reference frames, so that it utilizes less bandwidth in a data transmission channel, also referred to herein as a channel. Compression techniques include, e.g., Motion Picture Experts Group (MPEG), Motion Joint Photographic Experts Group (M-JPEG), and digital satellite systems standards. See, e.g., International Organization for Standardization (ISO), Coding of Moving Pictures and Audio, "MPEG-2 Generic Coding of Moving Pictures and Associated Audio Information," October 2000; "Overview of the MPEG-4 Standard," March 2002; ISO/International Electrotechnical Commission (IEC) 15444-3: 2002, "Information Technology—JPEG 2000 Image Coding System—Part 3: Motion JPEG 2000;" and Advanced Television Systems Committee (ATSC) "Modulation and Coding Requirements for Digital TV (DTV) Applications over Satellite," July 1999.

A base frame is a still picture that shows an image; it includes sufficient data for a viewer to identify the content of a digital video data stream to which the base frame belongs. A reference frame is a still picture that shows only the differences between the image in the reference frame and the image in a base frame upon which the reference frame is based. Typically, frames are separated into groups of frames (GOF) that start at a base frame and include any number of reference frames and additional base frames.

Figure 1:
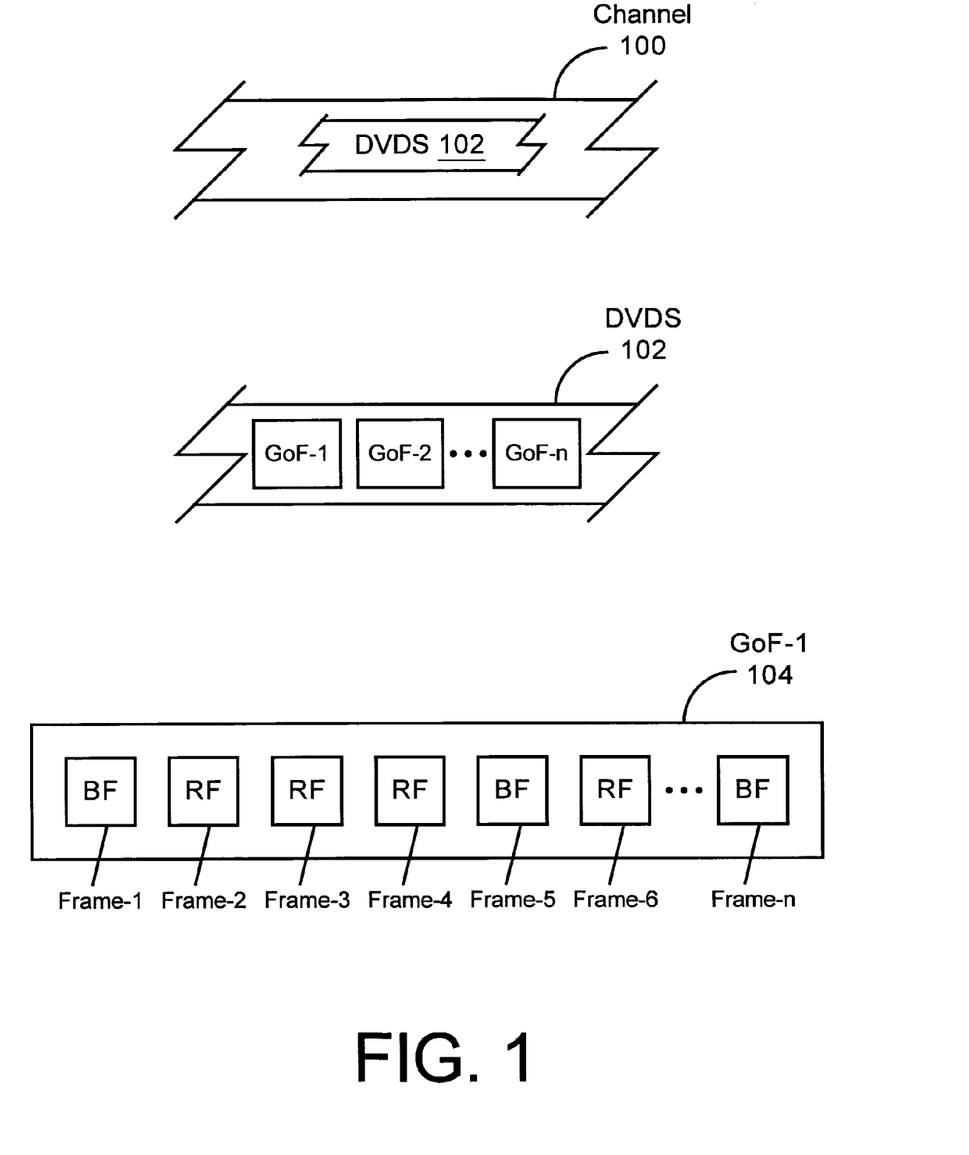
FIG. 1 illustrates an example of a digital video data stream.

FIG. 1 illustrates an example of a compressed digital video data stream. Channel 100 carries compressed digital video data stream (DVDS) 102, which is separated into any number n of GOFs, e.g., GOF-1, GOF-2 through GOF-n. A GOF, e.g., GOF-1 104, includes any number n of frames, frame-1, frame-2, etc. through frame-n, where each frame is either a base frame (BF) or a reference frame (RF).

MPEG, for example, compresses a digital video data stream into individual frames known as intra-frames (I-frames), predictive frames (P-frames) and bi-directional frames (B-frames). Generally speaking, an I-frame is a base frame that serves as a reference for P-frames and B-frames, which are thus reference frames. A P-frame describes the difference between the P-frame and the I-frame upon which it is based. Similarly, a B-frame describes the difference between the B-frame and a previous I-frame or P-frame and the difference between the B-frame and a following I-frame or P-frame.

A digital video receiver, e.g., a computer system, such as a desktop computer, a personal digital assistant (PDA), a laptop or palmtop computer, a cellular phone, a network access device, etc., or a set-top box, e.g., a digital cable television receiver or digital satellite television receiver, receives a compressed digital video data stream and decompresses the digital video data stream for display on a display device. A display device may be, but is not limited to, a television screen or computer system display device, e.g., a cathode ray tube (CRT) or a liquid crystal display (LCD).

At startup of a digital video receiver, or when the digital video receiver switches from one channel to another, e.g., because of user input from a remote control device or a push-button on the digital video receiver, the digital video receiver may execute a number of processes to receive and decompress a digital video data stream. These processes may include, e.g., locking onto a channel (e.g., by tuning to the frequency of the channel), acquiring a compressed digital video data stream on the channel, demodulating and decoding the compressed digital video data stream and providing a decompressed digital video data stream for display. As used herein, decompression includes the processes from startup of a digital video receiver, receipt of an indication to switch from one channel to another, or receipt of an indication to switch from a video device input mode (e.g., a digital video disc player) to a satellite, cable or antenna input mode, through presentation of a decompressed digital video data stream for display.

During decompression, a digital video receiver typically identifies a base frame that starts a GOF, decompresses the compressed digital video data stream one GOF at a time and presents each decompressed GOF for display. This typically results in a time delay between startup of the digital video receiver, or receiving an indication to switch from one channel to another, and displaying a decompressed GOF. During the time delay, a display device typically presents a blank screen to a viewer. This blank screen may appear for several seconds, which may be undesirable if the viewer wants to know relatively quickly the content of a digital video data stream on a particular channel, so that the viewer can decide whether to watch that channel.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

A method of displaying a base frame during video data decompression is described. In the following description, for purposes of explanation, numerous specific details are set forth. It will be apparent, however, to one skilled in the art that embodiments of the invention can be practiced without these specific details. In other instances, structures and devices are shown in block diagram form in order to avoid obscuring the understanding of this description.

In one embodiment, a tuner selects a base frame of a compressed digital video data steam. The tuner decompresses the selected base frame prior to decompressing the remaining frames of the digital video data stream, and provides the decompressed base frame to a display device for display prior to the tuner decompressing the remaining frames of the compressed digital video data stream.

In another embodiment, while a first tuner decompresses a first digital video data steam on a first channel, a second tuner selects a first base frame from a second digital video data stream on a buffered channel. The second tuner decompresses the selected base frame prior to decompressing the remaining frames of the second digital video data stream, and buffers the decompressed base frame.

An indication to switch from the first channel to a second channel is received. If the indication is to switch to the buffered channel, the second tuner provides the decompressed base frame to a display device for display prior to decompressing the second digital video data stream, then decompresses the second digital video data stream. Conversely, if the indication is to switch to a channel other than the buffered channel, the first tuner decompresses a base frame from a digital video data steam on the second channel, and provides to the display device the base frame from the second channel for display prior to decompressing the remaining frames of the digital video data stream on the second channel.

Figure 2:
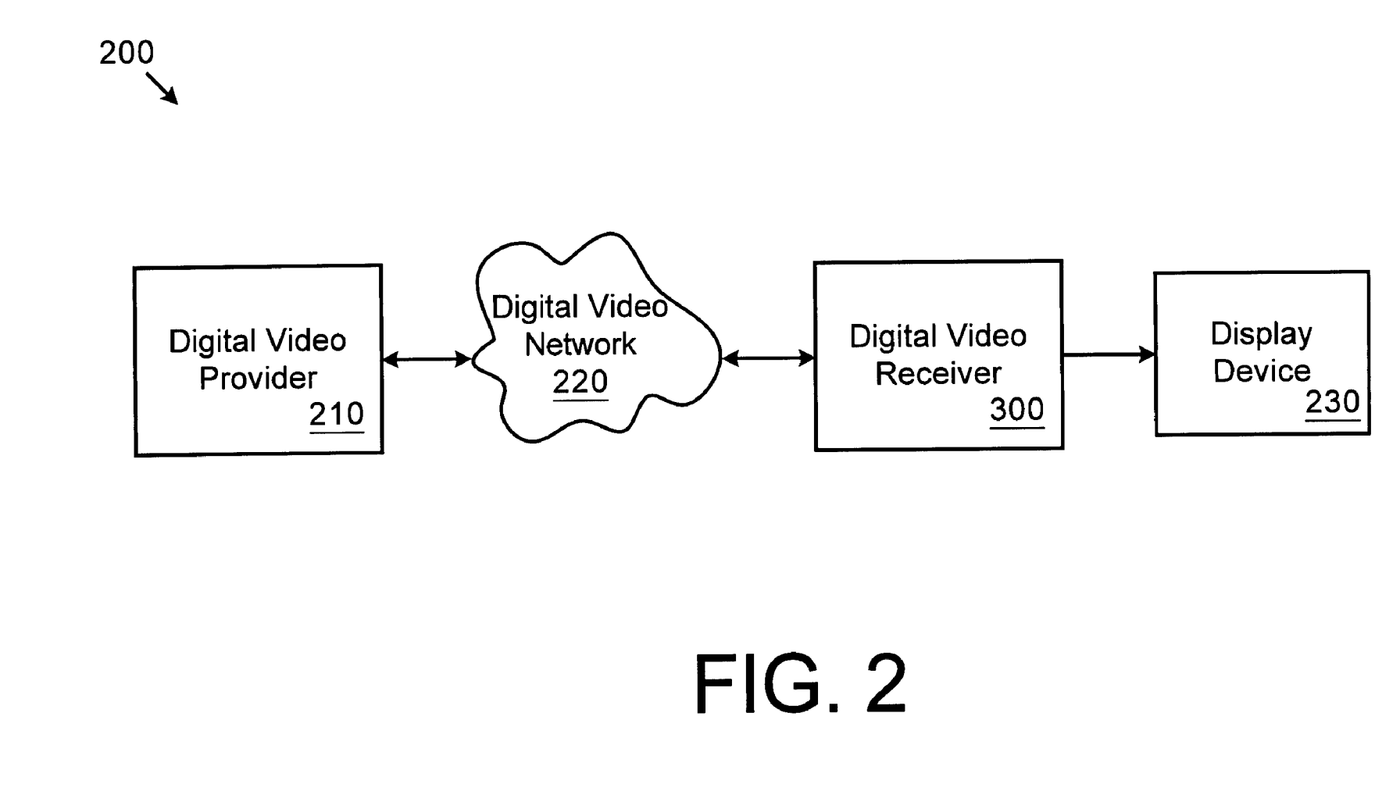
FIG. 2 is a block diagram illustrating an embodiment of a digital video system.

FIG. 2 is a block diagram illustrating an embodiment of a digital video system. Digital video system 200 includes digital video provider 210, such as, but not limited to, those mentioned previously, and digital video receiver 300, such as, but not limited to, those mentioned previously. Digital video provider 210 and digital video receiver 300 are coupled via a digital video network 220, which may be wired, e.g., a cable network or telephone line network, or wireless, e.g., a satellite network, a Bluetooth Network (see, e.g., Bluetooth Special Interest Group, "Specification of the Bluetooth System: Core," Volume 1, Doc. No. 1.C.47/1.0B, Dec. 1, 1999), a wireless local area network (see, e.g., Institute of Electrical and Electronics Engineers (IEEE) 802.11, 1999 Edition, "IEEE Standards for Information Technology—Telecommunications and Information Exchange Between Systems—Local and Metropolitan Area Network—Specific Requirements—Part 11: Wireless LAN Medium Access Control (MAC) and Physical Layer (PHY) Specifications," or other wireless carrier technology standards), or a combination of wired and wireless networks.

Digital video system 200 further includes display device 230 such as, but not limited to, those mentioned previously. Digital video receiver 300 and display device 230 may be separate components, e.g., where an output of digital video receiver 300 is coupled with an input of display device 230. However, digital video receiver 300 and display device 230 may be components of the same device, e.g., a television or a computer system.

Figure 3:
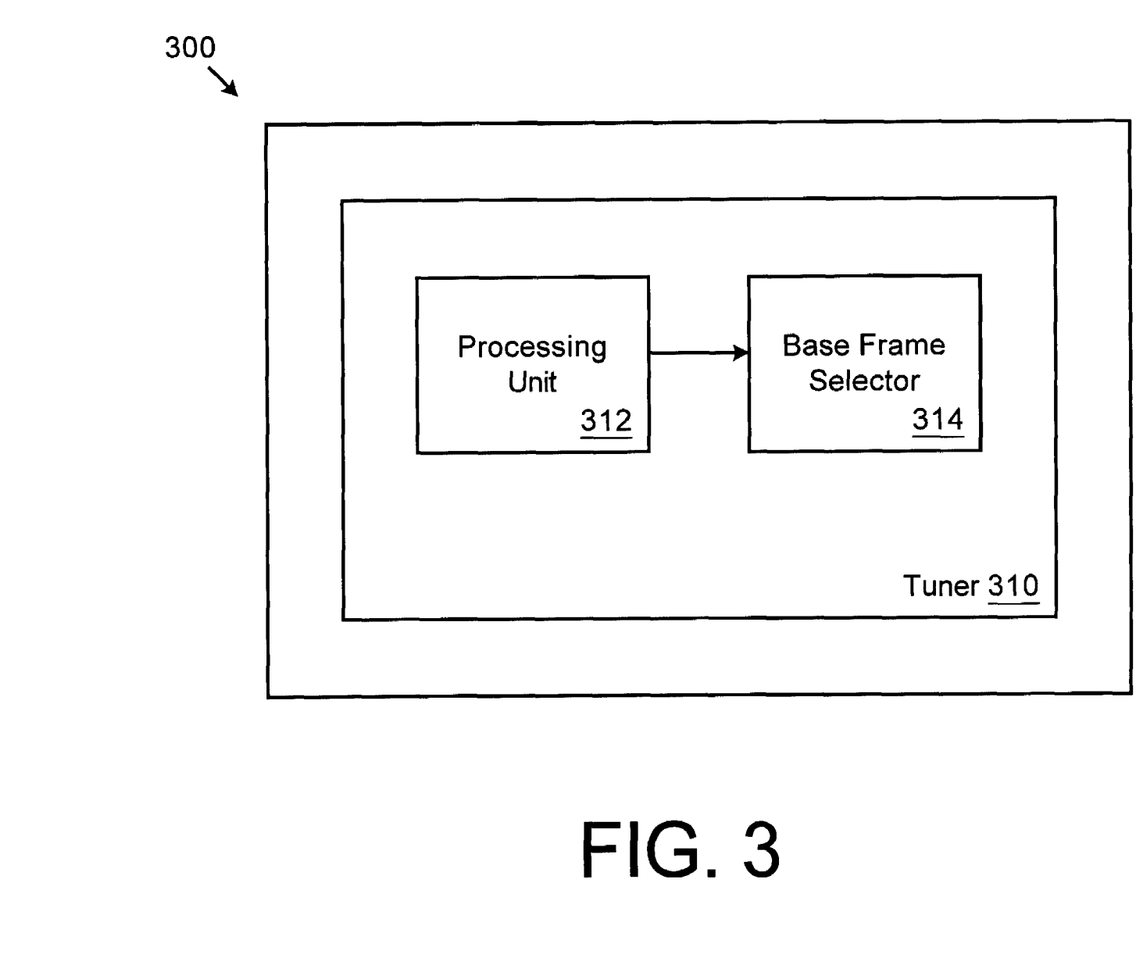
FIG. 3 is a block diagram illustrating an embodiment of a digital video receiver.

FIG. 3 is a block diagram illustrating an embodiment of a digital video receiver. Digital video receiver 300 includes tuner 310. Tuner 310 includes processing unit 312, which decompresses a compressed digital video data stream and presents a decompressed digital video data stream for display. Tuner 310 further includes base frame selector 314. Base frame selector 314 provides a decompressed base frame from processing unit 312 for display prior to processing unit 312 decompressing the remaining frames of the digital video data stream. Although processing unit 312 and base frame selector 314 are described as separate functional elements, they may be combined into a single multifunctional element that performs the functions of processing unit 312 and base frame selector 314.

Figure 4:
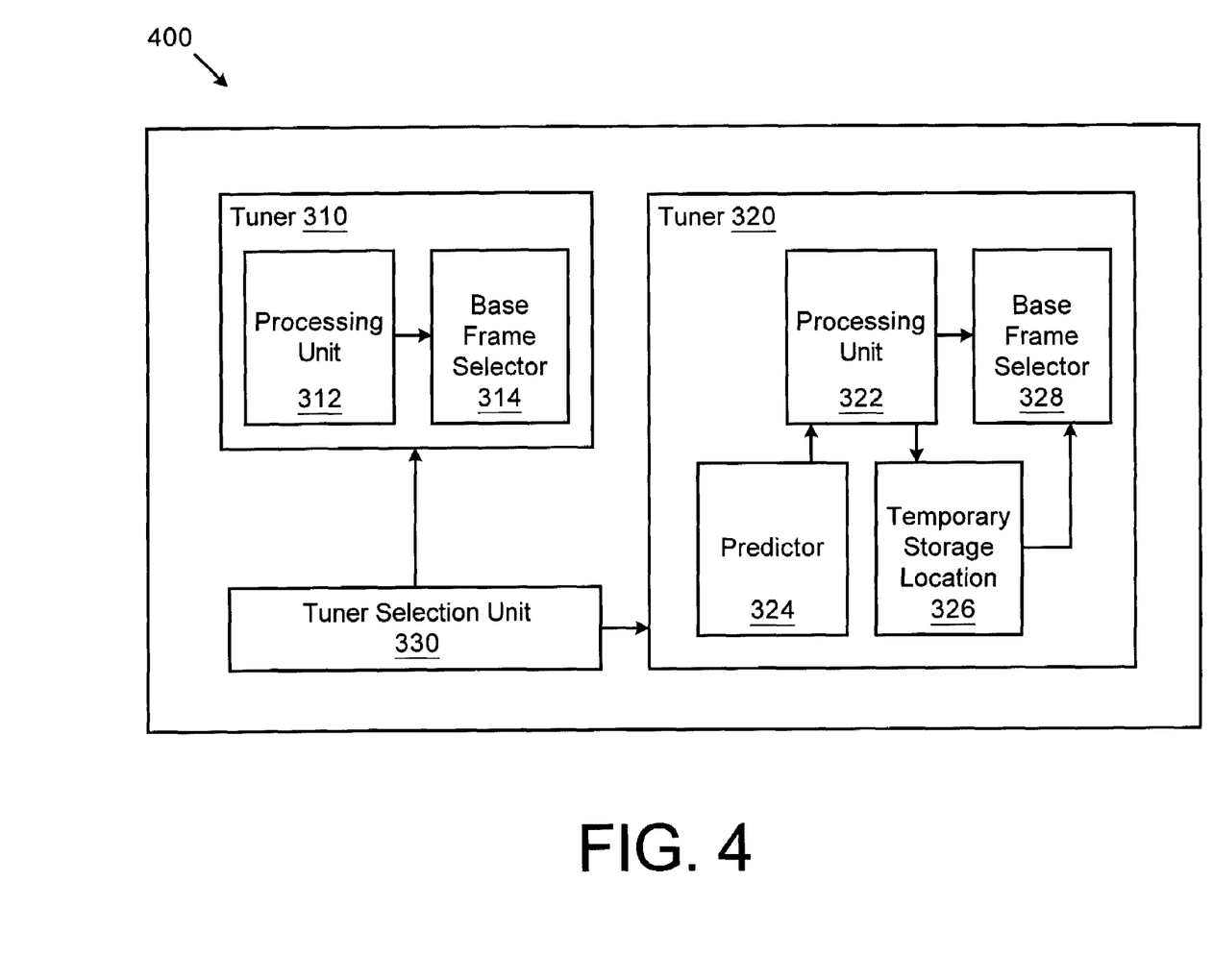
FIG. 4 is a block diagram illustrating another embodiment of a digital video receiver.

FIG. 4 is a block diagram illustrating another embodiment of a digital video receiver. In addition to tuner 310, digital video receiver 400 includes one or more tuners 320 and tuner selection unit 330. Tuner selection unit 330, e.g., a switch or infrared (IR) signal receiver, receives an indication to switch digital video receiver 400 from decompressing the digital video data stream on one channel to decompressing the digital video data stream on another channel, and determines whether tuner 310 or tuner 320 is to decompress the compressed digital video data stream on the newly indicated channel.

Tuner 320 includes processing unit 322, which in addition to being able to perform the functions of processing unit 312, is able to decompress a base frame on one or more channels separately from the digital video data stream to which the base frame belongs.

Tuner 320 may include one or more predictors 324. Predictor 324 dynamically selects one or more channels on which processing unit 322 is to decompress base frames separately from the digital video data stream to which a base frame belongs. Predictor 324 may utilize any number of techniques to select a channel on which to decompress a base frame, including, but not limited to, one or more channels adjacent to a current channel, one or more channels whose digital video data stream is frequently chosen for display, one or more channels recently chosen for display, or one or more channels whose subject matter, e.g., movies, sports, news is similar to the subject matter of a current channel.

It will be appreciated that some form of user-identification may be performed to allow dynamic selection techniques to be adjusted according to the current user of the system. A current user may be inferred based on monitored usage patterns, or determined by way of a login, identity query, or other technique for identifying a user. In such fashion, different family members, for example, will receive different selection results when operating the digital video receiver.

Tuner 320 may further include one or more temporary storage locations 326. Temporary storage location 326 is a data storage area, e.g., a buffer or a cache, in which processing unit 322 buffers one or more decompressed base frames. Because a base frame occupies only a portion of a channel's total bandwidth, tuner 320 may buffer base frames on more than one channel. Temporary storage location 326 may be temporary in that, for example, a base frame is moved into temporary storage location 326 and out for display in a relatively short period of time, or in that a base frame remains in temporary storage location 326 without being displayed only until the base frame is replaced by another base frame or until digital data receiver 300 is shut down. Temporary storage location 326 is intended to represent any number of data storage areas known in the art, and thus will not be described further except as it pertains to embodiments of the invention.

Tuner 320 may further include base frame selector 328, which is able to perform the functions of base frame selector 314. In addition, base frame selector 328 is able to select a base frame from temporary storage location 326 and provide the base frame for display, if processing unit 322 decompresses a digital video data stream on a channel having a decompressed base frame in temporary storage location 326.

FIG. 4 is described in terms of digital data receiver 400 including one tuner that is able to process and store a base frame separately from a digital video data stream and one tuner that does not have that capability. However, digital data receiver 400 may include two or more tuners that are able to process and store a base frame separately, but which is capable of selectively implementing that functionality, thus enabling a tuner that has the functionality of tuner 320 to perform as if it has only the functionality of tuner 310.

Although processing unit 322, predictor 324, base frame selector 328 and tuner selection unit 330 are described as separate functional elements, one or more of these functional elements may be combined into a single multifunctional element. In addition, although temporary storage location 326 is described as separate from processing unit 322, predictor 324, base frame selector 328 and tuner selection unit 330, temporary storage location 326 may be part of processing unit 322, predictor 324, base frame selector 328 or tuner selection unit 330, and may be external to tuner 320. Furthermore, tuner 310 and tuner 320 may be implemented in hardware, e.g., as an application specific integrated circuit (ASIC) or in software, e.g., as machine-readable instructions or machine-accessible instructions that, when executed, cause digital data receiver 300 to perform the functions of tuners 310 or 320.

Figure 5:
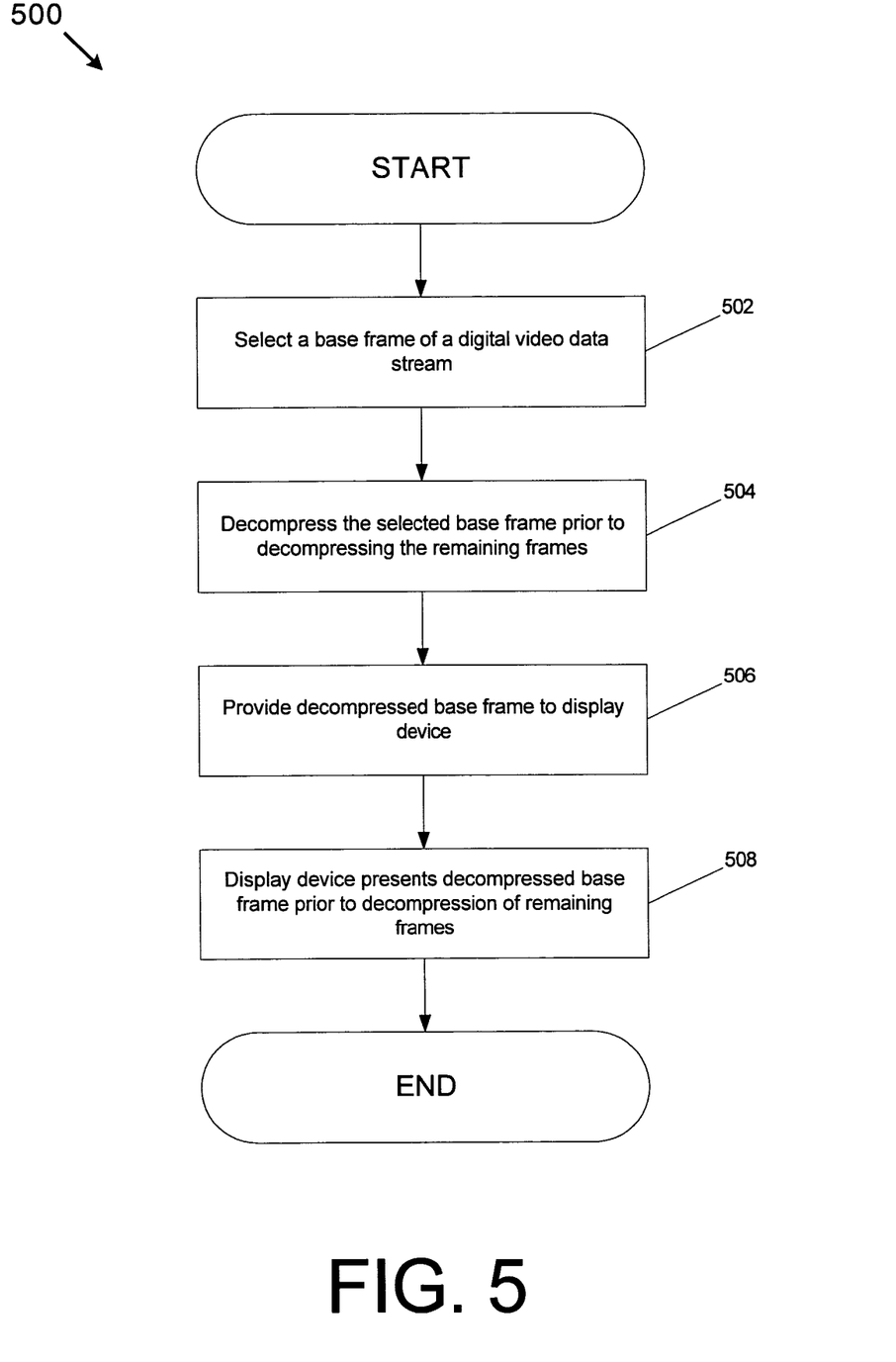
FIG. 5 is a flow chart illustrating an embodiment of a method of displaying a base frame during digital video data decompression.

FIG. 5 is a flow chart illustrating an embodiment of a method of displaying a base frame during digital video data decompression. At 502 of method 500, processing unit 312 selects a base frame of a compressed digital video data stream. In one embodiment, processing unit 312 selects the base frame at startup of digital video receiver 300. In another embodiment, processing unit 312 selects the base frame as a result of digital video receiver 300 receiving an indication to switch from one channel to another channel. In yet another embodiment, processing unit 312 selects the base frame as a result of an indication to switch from a video device input mode (e.g., input from a digital video disc player or video cassette recorder) to input from digital video receiver 300, which is set to a channel. Although described in terms of a base frame, method 500 may also be used with a reference frame.

In one embodiment, processing unit 312 selects any base frame in the digital video data stream. In another embodiment, processing unit 312 selects a base frame identified, e.g., by the source of the digital video data stream, as a base frame from a television program, rather than from a commercial or other break in the television program, e.g., a news break. In yet another embodiment, processing unit 312 is capable of determining, e.g., using automatic commercial break detection technology known in the art, which base frames are from a television program, rather than from a commercial or other break in the television program, e.g., a news break, and selects a television program base frame.

At 504 of method 500, processing unit 312 decompresses the selected base frame prior to decompressing remaining frames of the compressed digital video data stream. At 506, base frame selector 314 provides display device 230 with the decompressed base frame. At 508, display device 230 presents the base frame prior to processing unit 312 decompressing the remaining frames of the compressed digital video data stream.

Because a decompressed base frame is displayed prior to decompression of the digital video data stream to which the base frame belongs, the amount of time a viewer is presented with a blank screen is reduced. That is, rather than viewing a blank screen while a GOF is decompressed and eventually presented for display, in one embodiment, a viewer is presented with a blank screen during the time needed to decompress and present a base frame for display. Although the decompressed base frame is a still picture, the decompressed base frame includes sufficient data to enable the viewer to identify the content of the digital video data stream to which the base frame belongs. Thus, the viewer is able to determine whether to watch the television show, movie, etc. on a particular channel.

Figure 6:
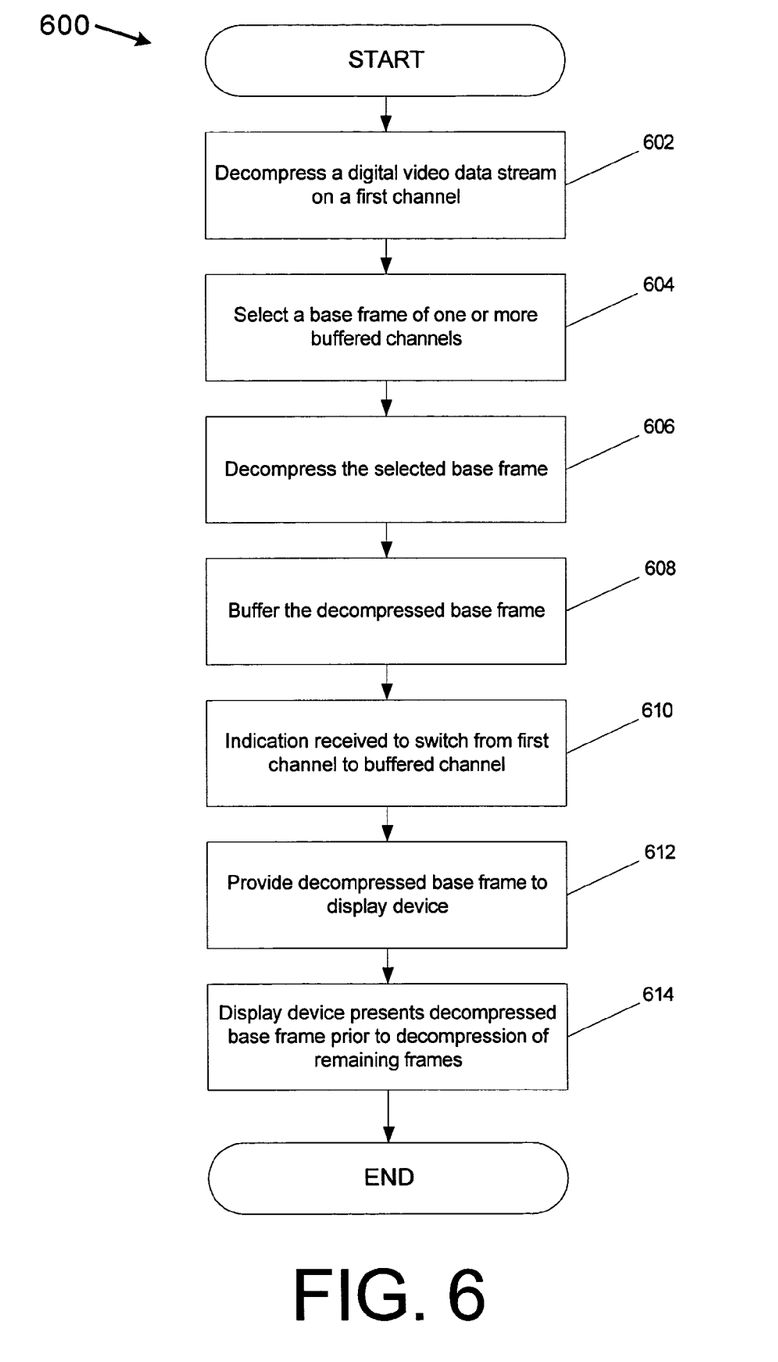
FIG. 6 is a flow chart illustrating another embodiment of a method of displaying a base frame during digital video data decompression.

FIG. 6 is a flow chart illustrating another embodiment of a method of displaying a base frame during digital video data decompression. At 602 of method 600, processing unit 312 decompresses a digital video data stream on a first channel. Although described in terms of a base frame, method 600 may also be used with a reference frame. At 604, processing unit 322 selects a base frame of a compressed digital video data stream on one or more second channels, referred to herein as buffered channels. In one embodiment, predictor 324 dynamically selects a buffered channel. In another embodiment, the buffered channel is a channel to which processing unit 322 is preset, e.g., one or more channels adjacent to a channel whose content is being displayed. Embodiments of selecting a base frame are described in more detail below.

At 606, processing unit 322 decompresses the selected base frame. At 608, processing unit 322 buffers the decompressed base frame in temporary storage location 326. At 610, tuner selection unit 330 receives an indication to switch video data receiver 400 from the first channel to a buffered channel. At 612, base frame selector 328 provides display device 230 with a decompressed base frame corresponding to the buffered channel, and at 614 display device 230 presents the decompressed base frame prior to processing unit 322 decompressing the remaining frames of the digital video data stream.

Figure 7:
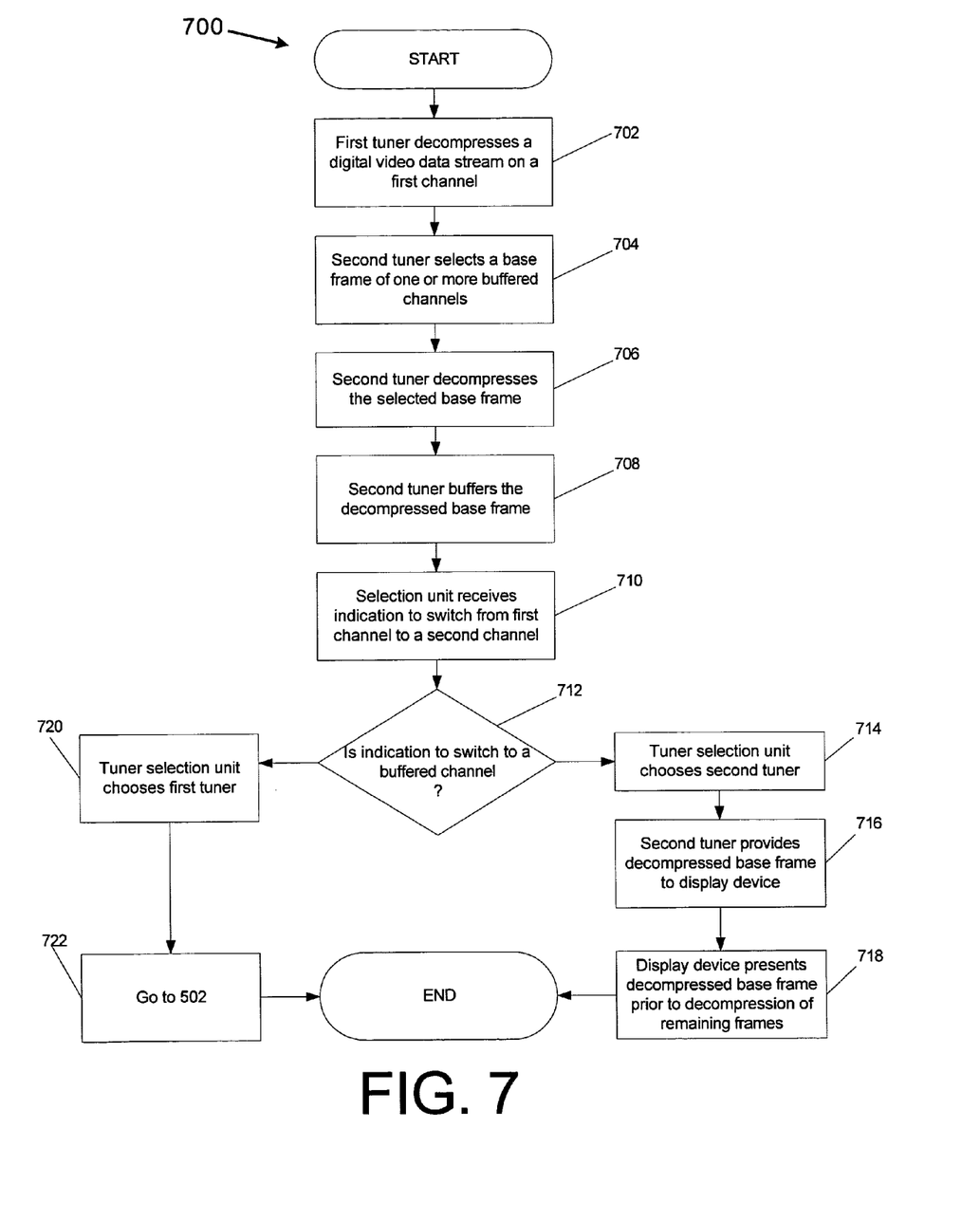
FIG. 7 is a flow chart illustrating yet another embodiment of a method of displaying a base frame during video data decompression.

FIG. 7 is a flow chart illustrating yet another embodiment of a method of displaying a base frame during video data decompression. At 702 of method 700, processing unit 312 decompresses a digital video data stream on a first channel. Although described in terms of a base frame, method 700 may also be used with a reference frame.

At 704, processing unit 322 selects a base frame of a compressed digital video data stream on one or more buffered channels to which digital video receiver 400 might switch, e.g., as a result of input from a viewer of display device 230, via a remote control device or channel-changing button located on display device 230 or receiving device 400. In one embodiment, predictor 324 dynamically selects a buffered channel. In another embodiment, the buffered channel is a channel to which processing unit 322 is preset, e.g., one or more channels adjacent to a channel whose content is being displayed.

In one embodiment, processing unit 322 selects any base frame in the digital video data stream on the buffered channel. In another embodiment, processing unit 322 selects a base frame identified, e.g., by the source of the digital video data stream, as a base frame from a television program, rather than from a commercial. In yet another embodiment, processing unit 322 is capable of determining, e.g., using automatic commercial break detection technology known in the art, which base frames are from a television program, rather than from a commercial, and selects a television program base frame.

At 706, processing unit 322 decompresses the selected base frame. At 708, processing unit 322 buffers the decompressed base frame in temporary storage location 326. The length of time that a base frame is stored depends on how the base frames are buffered. For example, if base frames on a single channel are being buffered, a base frame is overwritten every time a new base frame is received (e.g., in the case of MPEG-2, typically two times per second). However, if, for example, base frames on channels adjacent to a channel currently being viewed, processing unit 322 would buffer a base frame on one channel, switch to a different channel and buffer a base frame on that channel, tune back to the previous channel and buffer another base frame, which would overwrite the previously buffered base frame for that channel.

At 710, tuner selection unit 330 receives an indication to switch video data receiver 400 from the first channel to a second channel. In another embodiment, tuner selection unit 330 receives an indication to switch from a video device input mode (e.g., input from a digital video disc player or video cassette recorder) to input from video data receiver 400, which is set to a channel. At 712, tuner selection unit 330 determines whether the indication is to switch to a buffered channel that has a base frame buffered in temporary storage location 326. If the indication is to switch to a channel other than a buffered channel, at 720, tuner selection unit chooses tuner 310, which at 722 performs method 500.

However, if the indication is to switch to a buffered channel, at 714, tuner selection unit 330 chooses tuner 320. At 716, base frame selector 328 provides display device 230 with a decompressed base frame corresponding to the buffered channel, and at 718 display device 230 presents the decompressed base frame prior to processing unit 322 decompressing the remaining frames of the digital video data stream. In one embodiment, the base frame presented for display is a base frame currently in temporary storage location 326 at the time a base frame is to be presented for display. In an alternative embodiment, the base frame presented is updated from a base frame currently in temporary storage location 326 to the most recent base frame in the digital video data stream at the time at the time a base frame is to be presented for display.

Although method 700 is described in terms of tuner 310 performing method 500 if video data receiver 400 switches to a channel whose base frame is not buffered, tuner 320 may perform method 500 if video data receiver 400 switches to a channel whose base frame is not buffered.

Because a base frame is displayed prior to decompression of the digital video data stream to which the base frame belongs, the amount of time a viewer sees a blank screen is reduced. That is, rather than seeing a blank screen during the time a video data receiver decompresses a GOF and presents it for display, or even during the time the video data receiver decompresses a base frame and presents it for display, a viewer sees a blank screen only during the time a buffered decompressed base frame is presented for display.

FIGS. 5-7 describe example embodiments of the invention in terms of a method. However, one should also understand it to represent a machine-accessible medium having recorded, encoded or otherwise represented thereon instructions, routines, operations, control codes, or the like, that when executed by or otherwise utilized by an electronic system, cause the electronic system to perform the methods as described above or other embodiments thereof that are within the scope of this disclosure.

Figure 8:
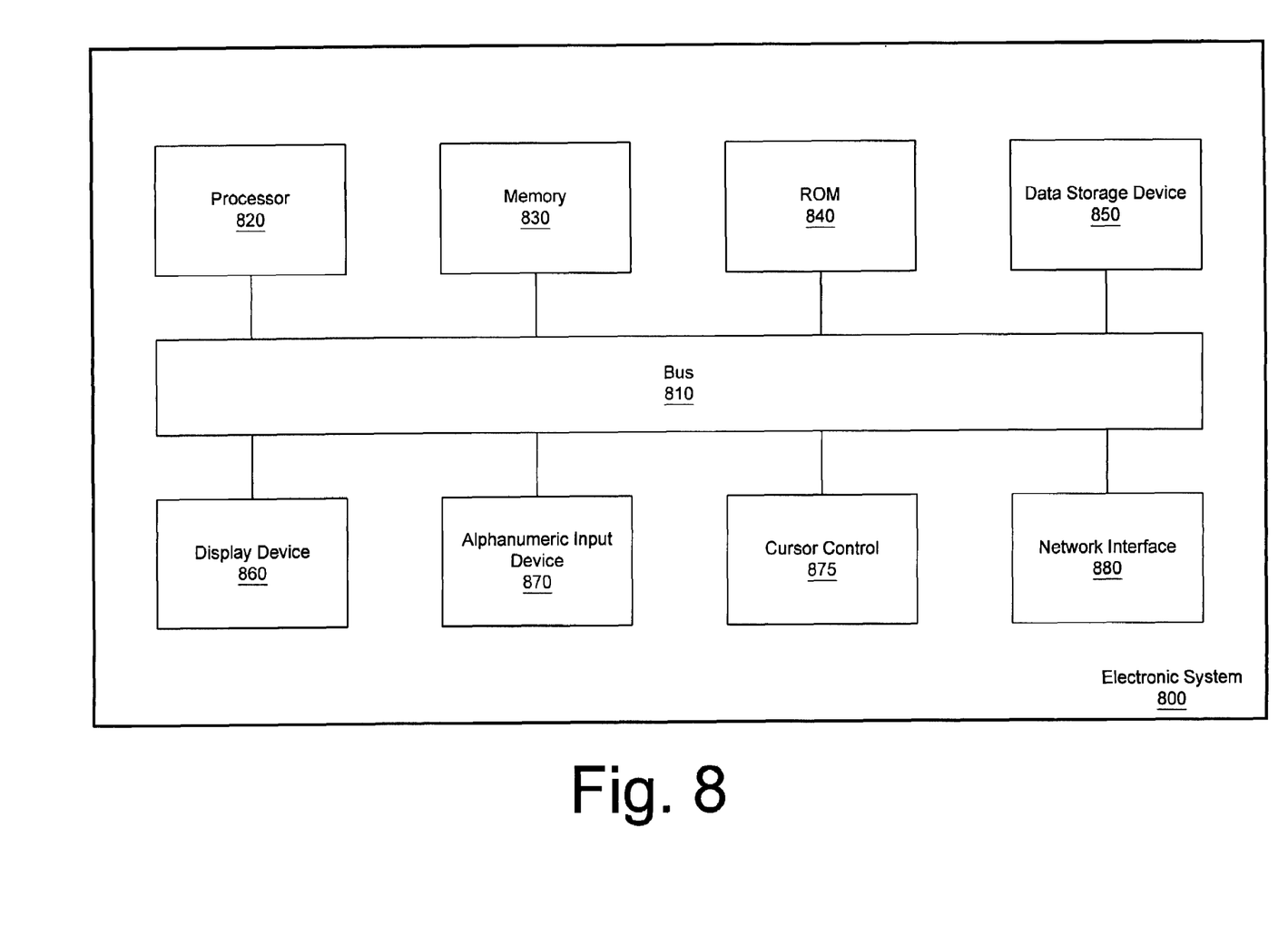
FIG. 8 is a block diagram illustrating one embodiment of an electronic system.

FIG. 8 is a block diagram illustrating one embodiment of an electronic system. The electronic system is intended to represent a range of electronic systems, including, for example, a personal computer, a personal digital assistant (PDA), a laptop or palmtop computer, a cellular phone, a computer system, a network access device, etc. Other electronic systems can include more, fewer and/or different components. The methods of FIGS. 5-7 can be implemented as sequences of instructions executed by the electronic system. The sequences of instructions can be stored by the electronic system, or the instructions can be received by the electronic system (e.g., via a network connection). The electronic system can be coupled to a wired or wireless network.

Electronic system 800 includes a bus 810 or other communication device to communicate information, and processor 820 coupled to bus 810 to process information. While electronic system 800 is illustrated with a single processor, electronic system 800 can include multiple processors and/or co-processors.

Electronic system 800 further includes random access memory (RAM) or other dynamic storage device 830 (referred to as memory), coupled to bus 810 to store information and instructions to be executed by processor 820. Memory 830 also can be used to store temporary variables or other intermediate information while processor 820 is executing instructions. Electronic system 800 also includes read-only memory (ROM) and/or other static storage device 840 coupled to bus 810 to store static information and instructions for processor 820. In addition, data storage device 850 is coupled to bus 810 to store information and instructions. Data storage device 850 may comprise a magnetic disk (e.g., a hard disk) or optical disc (e.g., a CD-ROM) and corresponding drive.

Electronic system 800 may further comprise a display device 860, such as a cathode ray tube (CRT) or liquid crystal display (LCD), to display information to a user. Alphanumeric input device 870, including alphanumeric and other keys, is typically coupled to bus 810 to communicate information and command selections to processor 820. Another type of user input device is cursor control 875, such as a mouse, a trackball, or cursor direction keys to communicate direction information and command selections to processor 820 and to control cursor movement on display device 860. Electronic system 800 further includes network interface 880 to provide access to a network, such as a local area network or wide area network.

Instructions are provided to memory from a machine-accessible medium, or an external storage device accessible via a remote connection (e.g., over a network via network interface 880) providing access to one or more electronically-accessible media, etc. A machine-accessible medium includes any mechanism that provides (i.e., stores and/or transmits) information in a form readable by a machine (e.g., a computer). For example, a machine-accessible medium includes RAM; ROM; magnetic or optical storage medium; flash memory devices; electrical, optical, acoustical or other form of propagated signals (e.g., carrier waves, infrared signals, digital signals); etc.

In alternative embodiments, hard-wired circuitry can be used in place of or in combination with software instructions to implement the embodiments of the present invention. Thus, the embodiments of the present invention are not limited to any specific combination of hardware circuitry and software instructions.

Reference in the foregoing specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the embodiments of the invention. The specification and drawings are, accordingly, are to be regarded in an illustrative rather than a restrictive sense.

What is claimed is:

1. A method comprising:
   selecting a base frame from a group of frames of a digital video data stream, wherein at least one frame in the group of frames is encoded with an encoding technique utilizing bi-directional encoding;
   decompressing the selected base frame prior to decompressing other frames of the group of frames; and
   providing the decompressed base frame to a display device for display prior to decompressing the other frames of the group of frames.

2. The method of claim 1, wherein selecting the base frame comprises selecting the base frame as a result of receiving an indication to switch to a channel carrying the compressed digital video data stream.

3. The method of claim 1, wherein selecting the base frame comprises selecting the base frame as a result of powering up.

4. The method of claim 1, wherein the base frame comprises one from a group comprising a Motion Picture Experts Group (MPEG) intra-frame (I-frame), a Motion Joint Photographic Experts Group(M-JPEG) base frame, a digital satellite standard base frame and a reference frame.

5. A method comprising:
   decompressing a first digital video data stream on a first channel;
   selecting a base frame from a group of frames of a second digital video data stream on a second channel;
   decompressing the base frame from the second digital video data stream;
   buffering the decompressed base frame;
   receiving an indication to switch from the first channel to the second channel; and
   providing, as a result of the indication to switch to the second channel, the decompressed base frame to a display device for display prior to decompressing other frames of the group of frames.

6. The method of claim 5, wherein selecting the base frame comprises selecting the base frame based, at least in part, on determining that the base frame is from a television program.

7. The method of claim 5, further comprising buffering a most recent base frame in the compressed second digital video data stream, to update the decompressed base frame provided for display.

8. The method of claim 5, further comprising dynamically selecting the second channel.

9. The method of claim 8, wherein the second channel is dynamically selected based, at least in part, on the first channel.

10. The method of claim 9, wherein the second channel comprises a channel adjacent to the first channel.

11. The method of claim 8, wherein the second channel is dynamically selected based, at least in part, on a frequency of display of a digital video data stream on the second channel.

12. The method of claim 5, wherein the second channel comprises a channel preset based, at least in part, on the first channel.

13. The method of claim 12, wherein the second channel comprises a channel adjacent to the first channel.

14. A method comprising:
   decompressing a first digital video data stream on a first channel;
   selecting a first base frame from a group of frames of a second digital video data stream on a buffered channel;
   decompressing the selected base frame prior to decompressing other frames of the group of frames of the second digital video data stream;
   buffering the decompressed first base frame;
   receiving an indication to switch from the first channel to a second channel;
   determining whether the indication is to switch to the buffered channel;
   if the indication is to switch to the buffered channel:
      providing the decompressed first base frame to a display device for display prior to decompressing other frames of the group of frames, and
      decompressing the second digital video data stream on the buffered channel; and
   if the indication is to switch to a channel other than the buffered channel:
      decompressing a second base frame from a group of frames of a third digital video data stream on the second channel, and
      providing to the display device a decompressed second base frame for display prior to decompressing other frames from the group of frames of the third digital video data stream.

15. The method of claim 14, further comprising dynamically selecting the buffered channel.

16. The method of claim 14, wherein the buffered channel comprises a preset channel.

17. An apparatus comprising:
   a tuner selection unit to receive an indication to switch from a first channel to a second channel;
   a first tuner, coupled with the tuner selection unit, to decompress a first digital video data stream on a first channel; and
   a second tuner, coupled with the tuner selection unit, to decompress a base frame from a group of frames of a second digital video data stream on the second channel, buffer the decompressed base frame, and provide, as a result of the indication to switch to the second channel, the decompressed base frame to a display device for display prior to decompressing other frames of the group of frames.

18. The apparatus of claim 17, wherein the tuner selection unit further determines whether the indication is to switch to the second channel, chooses the first tuner if the indication is to switch to a channel other than the second channel, and chooses the second tuner if the indication is to switch to the second channel.

19. The apparatus of claim 17, further comprising a predictor, coupled with the second tuner, to dynamically select the buffered channel.

20. The apparatus of claim 17, wherein the base frame comprises one from a group comprising a Motion Picture Experts Group (MPEG) intra-frame (I-frame), a Motion Joint Photographic Experts Group (M-JPEG) base frame, a digital satellite standard base frame, and a reference frame.

21. A system comprising:
   a digital video receiver to select a base frame from a group of frames of a digital video data stream, wherein at least one frame in the group of frames is encoded with an encoding technique utilizing bi-directional encoding, decompress the selected base frame prior to decompressing other frames from the group of frames, and provide the decompressed base frame to a display device for display prior to decompressing other frames from the group of frames; and the display device, coupled with the digital video receiver, to display the decompressed base frame and the decompressed digital video data stream.

22. The system of claim 21, wherein the digital video receiver comprises a computer system.

23. The system of claim 22, wherein the display device comprises a computer monitor.

24. A system comprising:

a digital video receiver to select a base frame from a group of frames of a compressed digital video data stream on a buffered channel, decompress the selected base frame prior to decompressing other frames from the group of frames, buffer the decompressed base frame and, if receiving an indication to switch to the buffered channel, provide the decompressed base frame to a display device, for display prior to decompressing other frames from the group of frames; and the display device, coupled with the digital video receiver, to display the decompressed base frame and the decompressed digital video data stream.

25. The system of claim 24, wherein the digital video receiver comprises a computer system.

26. The system of claim 25, wherein the display device comprises a computer display screen.

27. An article of manufacture comprising:

a tangible computer-readable medium including thereon sequences of instructions that, when executed, cause an electronic system to:

select a base frame from a group of frames of a digital video data stream, wherein at least one frame in the group of frames is encoded with an encoding technique utilizing bi-directional encoding;

decompress the selected base frame prior to decompressing other frames of the group of frames; and provide the decompressed base frame to a display device for display prior to decompressing the other frames of the group of frames.

28. The article of manufacture of claim 27, wherein the sequences of instructions that, when executed, cause the electronic system to select the base frame comprise sequences of instructions that, when executed, cause the electronic system to select the base frame as a result of receiving an indication to switch to a channel carrying the compressed digital video data stream.

29. The article of manufacture of claim 27, wherein the sequences of instructions that, when executed, cause the electronic system to select the base frame comprise sequences of instructions that, when executed, cause the electronic system to select the base frame from one of a group comprising a Motion Picture Experts Group (MPEG) intra-frame (I-frame), a Motion Joint Photographic Experts Group (M-JPEG) base frame, a digital satellite standard base frame and a reference frame.

30. An article of manufacture comprising:

a tangible computer-readable medium including thereon sequences of instructions that, when executed, cause an electronic system to:

decompress a first digital video data stream on a first channel;

select a base frame from a group of frames of a second digital video data stream on a second channel;

decompress the base frame from the second digital video data stream;

buffer the decompressed base frame;

receive an indication to switch from the first channel to the second channel; and provide, as a result of the indication to switch to the second channel, the decompressed base frame to a display device for display prior to decompressing other frames of the group of frames.

31. The article of manufacture of claim 30, wherein the machine-accessible medium further comprises sequences of instructions that, when executed, cause the electronic system to dynamically select the second channel.

32. The article of manufacture of claim 30, wherein the sequences of instructions that, when executed, cause the electronic system to select the base frame comprise sequences of instructions that, when executed, cause the electronic system to select one from a group comprising a Motion Picture Experts Group (MPEG) intra-frame(I-frame), a Motion Joint Photographic Experts Group (M-JPEG) base frame, a digital satellite standard base frame and a reference frame.

* * * * *